(12) United States Patent
Horst

(10) Patent No.: US 8,365,898 B2
(45) Date of Patent: Feb. 5, 2013

(54) PICK-UP ASSEMBLY

(75) Inventor: Mark Horst, Ethel (CA)

(73) Assignee: Marcrest Manufacturing Inc., Ethel, Ontario (CA)

( * ) Notice: Subject to any disclaimer, the term of this patent is extended or adjusted under 35 U.S.C. 154(b) by 196 days.

(21) Appl. No.: 12/876,583

(22) Filed: Sep. 7, 2010

(65) Prior Publication Data

US 2012/0055759 A1    Mar. 8, 2012

(51) Int. Cl.
B65G 65/02    (2006.01)

(52) U.S. Cl. ......... 198/512; 414/111; 414/486; 414/489

(58) Field of Classification Search .................. 198/512, 198/514, 518; 414/111, 338, 486, 489, 789.7
See application file for complete search history.

(56) References Cited

U.S. PATENT DOCUMENTS

| | | |
|---|---|---|
| 1,234,078 A | 7/1917 | Pate |
| 1,671,966 A | 6/1928 | Burkholder |
| 1,819,480 A | 8/1931 | Paxton |
| 2,209,740 A | 7/1940 | Steinhauer |
| 2,397,570 A * | 4/1946 | Smoker .......... 198/310 |
| 2,428,672 A | 10/1947 | McClellan et al. |
| 2,870,922 A * | 1/1959 | Thomson .......... 414/792 |
| 3,070,006 A | 12/1962 | Raney et al. |
| 3,099,952 A | 8/1963 | Dixon et al. |
| 3,521,734 A * | 7/1970 | Kerber, Jr. .......... 209/241 |
| 4,043,461 A | 8/1977 | Castro |
| 4,059,049 A | 11/1977 | Tillgren |
| 4,074,623 A | 2/1978 | White |
| 4,179,017 A | 12/1979 | Tilley |
| 4,212,579 A | 7/1980 | Stromberg |
| 4,355,713 A * | 10/1982 | Adam .......... 198/514 |
| 4,359,306 A | 11/1982 | Zimmerman |
| 4,436,029 A | 3/1984 | Goldhammer |
| 4,456,235 A | 6/1984 | Colglazier et al. |
| 4,498,829 A | 2/1985 | Spikes |
| 4,676,153 A | 6/1987 | Ast |
| 4,718,335 A | 1/1988 | Ast |
| 4,741,425 A | 5/1988 | Land |
| 4,783,892 A | 11/1988 | Hergeth |
| 4,832,553 A * | 5/1989 | Grey et al. .......... 414/789.7 |
| 4,854,809 A | 8/1989 | Rhodes |
| 5,094,338 A | 3/1992 | Schneider et al. |
| 5,123,338 A | 6/1992 | Mathis |

(Continued)

FOREIGN PATENT DOCUMENTS

| | | |
|---|---|---|
| CA | 2312768 | 6/1999 |
| CA | 2548635 | 6/1999 |

(Continued)

OTHER PUBLICATIONS

Arcusin brochure re Auto Stack Automatic Bale Loader, date of publication unknown (Applicant became aware of this reference no later than Dec. 2004).

Primary Examiner — Douglas Hess

(57) ABSTRACT

A pick-up assembly for moving an object off a surface. The pick-up assembly includes a conveyor subassembly extending between lower and upper ends thereof. The conveyor subassembly includes a conveying means extending between the lower and upper ends, for moving the object to the upper end. The pick-up assembly also includes two or more engagement devices positioned proximal to the lower end of the conveyor subassembly for engaging opposite sides of the object respectively, to move the object onto the conveyor belt.

5 Claims, 13 Drawing Sheets

U.S. PATENT DOCUMENTS

| | | | |
|---|---|---|---|
| 5,211,345 | A | 5/1993 | Siebenga |
| 5,224,827 | A | 7/1993 | Wong |
| 5,224,911 | A | 7/1993 | Wong |
| 5,299,684 | A | 4/1994 | Ransom |
| 5,316,431 | A * | 5/1994 | Barber ............... 414/523 |
| 5,353,698 | A | 10/1994 | Robbins |
| 5,405,229 | A | 4/1995 | Tilley et al. |
| 5,478,194 | A | 12/1995 | Tilley et al. |
| 5,501,562 | A | 3/1996 | Zimmerman |
| 5,542,803 | A | 8/1996 | Driggs |
| 5,607,274 | A | 3/1997 | Cook |
| 5,690,461 | A | 11/1997 | Tilley |
| 5,697,758 | A | 12/1997 | Tilley |
| 5,704,283 | A | 1/1998 | Wiedel |
| 5,735,197 | A | 4/1998 | Kleine |
| 5,887,504 | A | 3/1999 | Gombos et al. |
| 5,921,738 | A | 7/1999 | Rempel |
| 6,016,731 | A | 1/2000 | Gombos et al. |
| 6,079,926 | A | 6/2000 | Cox et al. |
| 6,171,046 | B1 | 1/2001 | Nutcher |
| 6,182,563 | B1 | 2/2001 | Brown, Jr. |
| 6,364,591 | B1 | 4/2002 | Stevenson |
| 6,397,738 | B1 | 6/2002 | Brown, Jr. |
| 6,655,266 | B2 | 12/2003 | Brown, Jr. |
| 7,080,494 | B2 | 7/2006 | Toews |
| 7,610,851 | B1 | 11/2009 | Horst |
| 8,122,822 | B1 * | 2/2012 | Horst ............... 100/3 |
| 2004/0076507 | A1 | 4/2004 | Forhaug et al. |

FOREIGN PATENT DOCUMENTS

| | | |
|---|---|---|
| CA | 2548703 | 6/1999 |
| FR | 2581828 | 11/1986 |

* cited by examiner

PICK-UP ASSEMBLY

FIELD OF THE INVENTION

The present invention is a pick-up assembly for moving an object off a surface.

BACKGROUND OF THE INVENTION

For many years, forage has been cut and tied into bales of different dimensions. For example, a typical bale of hay 10 is formed which is about 18 inches wide (W), 14 inches high (H), and 35 inches in length (L) (FIG. 1A). However, as is well known in the art, the bales may have various other width and height dimensions (e.g., 16 inches×18 inches, or 18 inches×22 inches), and the length may vary between about 30 inches to about 48 inches. As can be seen in FIG. 1A, the bale customarily rests on a bottom wall (not shown) having an area of L×W, presenting an identical top wall (also having an area of L×W), and exposing two sidewalls, each with an area of H×W.

As is well known in the art, the bales may be positioned in rows on the ground in the field after they are formed, so that they may be conveniently picked up, for transportation and/or processing. However, the prior art devices for picking up bales, which typically are mounted on a machine or vehicle, have some disadvantages. For instance, in a common type of pick-up device of the prior art (not shown), chains are mounted on a conveyor, and the chains include teeth (or other similar grabbing means) that are partially embedded in the bale. The teeth are pressed into the bale upon the chain engaging the bale, and the bale is thereby held on the chain, so that the bale is then moved along the conveyor. However, the teeth can damage the bale somewhat when inserted, and/or when removed.

As is well known in the art, it is advantageous to pick up the bales when the machine is moving, e.g., the machine may travel at a speed of about 8 km/hr. to about 15 km/hr, picking up bales without stopping. However, with the pick-up devices of the prior art, the bale is sometimes not picked up quickly, and the bale is then pushed along the ground by the pick-up device for a distance before the bale is picked up. This delay in picking up the bale results in dirt becoming embedded in the bale, thereby causing potentially significant problems.

SUMMARY OF THE INVENTION

For the foregoing reasons, there is a need for an improved bale pick-up assembly which overcomes or mitigates one or more of the defects of the prior art.

In its broad aspect, the invention provides a pick-up assembly for moving an object off a surface. The pick-up assembly includes a conveyor subassembly extending between lower and upper ends thereof. The conveyor subassembly includes a conveying means extending between the lower and upper ends, for moving the object to the upper end. The pick-up assembly also includes two or more engagement devices positioned proximal to the lower end of the conveyor subassembly for engaging opposite sides of the object respectively, to move the object onto the conveying means.

In another aspect, the engagement devices lift the object at least partially over the lower end as the object is moved thereby onto the conveying means.

In another aspect of the invention, each of the engagement devices is rotatable about an engagement device axis therefor.

In yet another aspect, the conveying means is an endless conveyor belt, and the conveyor subassembly additionally includes lower and upper conveyor rollers positioned substantially at the lower and upper ends respectively, for engaging the conveyor belt.

In another aspect, the lower and upper conveyor rollers (and/or the lower and upper ends) define one or more conveyor planes therebetween.

In one aspect of the invention, each engagement device axis is positioned at a preselected angle therefor relative to the conveyor plane, for lifting the object at least partially over the lower end of the conveyor subassembly as the object is moved onto the conveyor belt.

In another aspect, each of the engagement devices is a roller.

In yet another aspect, each roller is mounted in a bracket movable between an inner position, in which the roller is located proximal to the lower end of the conveyor subassembly, and an outer position, in which the roller is located distal to the lower end of the conveyor subassembly.

In another aspect, each bracket is at least partially supported by a stop element therefor.

In another of its aspects, the invention additionally provides a control bar subassembly, for pressing the bale onto the conveyor belt.

In one aspect of the invention, the control bar subassembly includes a control bar extending between a front end and a back end thereof, a control bar bracket in which the front end of the control bar is pivotably mounted, and a spring means engageable with the control bar, for urging the control bar toward the conveyor belt, for pressing each said bale onto the conveyor belt.

In another of its aspects, the invention additionally provides a floatation suspension, for maintaining the conveyor subassembly in a substantially consistent position relative to the surface.

In yet another aspect, the floatation suspension includes a spring support means pivotably connected to the conveyor subassembly, for urging the conveyor subassembly to a predetermined position relative to the surface, and a hydraulic cylinder, pivotably connected to the conveyor subassembly, for urging the conveyor subassembly to the predetermined position. The flotation suspension also includes a linkage bracket pivotably connected to the conveyor subassembly and extending between first and second ends thereof, the linkage bracket being pivotably connected to the conveyor subassembly at the first end thereof. The hydraulic cylinder means are pivotably connected to the linkage bracket at the second end. The spring support means and the hydraulic cylinder means urge the conveyor subassembly to the predetermined position relative to the surface.

BRIEF DESCRIPTION OF THE DRAWINGS

The invention will be better understood with reference to the attached drawings, in which.

DETAILED DESCRIPTION

Figure 1A:
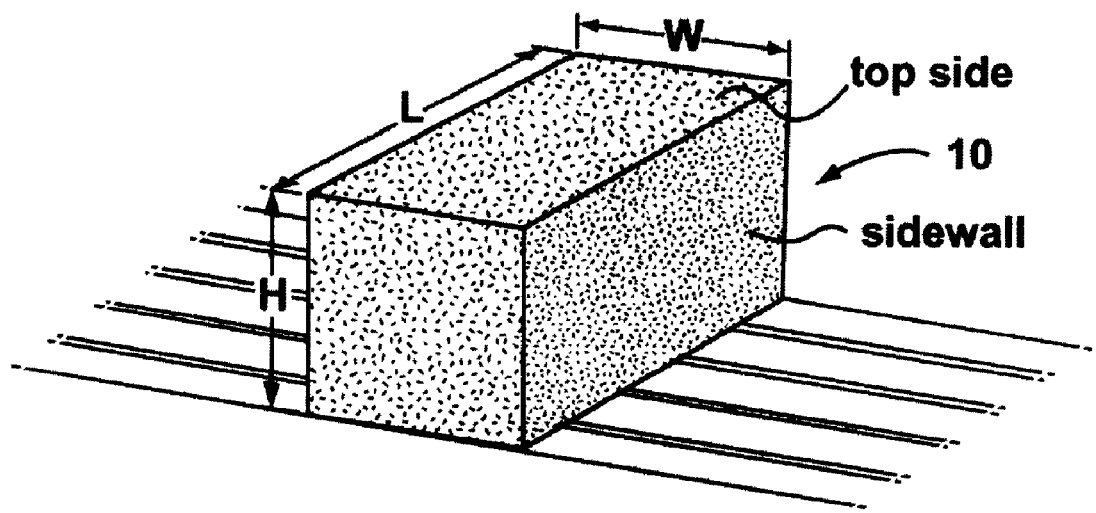
FIG. 1A (previously described) is an isometric view of a typical bale.

In the attached drawings, like reference numerals designate corresponding elements throughout. Reference is first made to FIGS. 1B-10 to describe an embodiment of a pick-up assembly of the invention referred to generally by the numeral 20. The pick-up assembly 20 is for moving the object 10 (e.g., a bale) off a surface 22 (FIGS. 5A-7). In one embodiment, the pick-up assembly 20 includes a conveyor subassembly 24 extending between lower and upper ends thereof 26, 28. Preferably, the conveyor subassembly 24 includes a conveying means 34 extending between the lower and upper ends 26, 28 respectively, for moving the object to the upper end 28. The pick-up assembly 20 preferably also includes two or more engagement devices 42, 44 (FIGS. 1B-3) positioned proximal to the lower end 26 of the conveyor subassembly 24 for engaging opposite sidewalls $S_1$, $S_2$ of the object 10 respectively (FIG. 3), to move the object 10 onto the conveyor means 34, as will be described.

Preferably, the engagement devices 42, 44 lift the object at least partially over the lower end 26 as the object 10 is moved thereby onto the conveying means 34.

As will also be described, in one embodiment, each of the engagement devices 42, 44 preferably is rotatable about an engagement device axis "X" therefor. The engagement device axes for the engagement devices 42, 44 are designated "$X_1$" and "$X_2$" respectively for convenience, as can be seen in FIGS. 1B and 4-6.

Those skilled in the art will appreciate that the conveying means may be any suitable means for conveying the objects (i.e., bales) to the upper end 28 of the conveyor subassembly 24. In one embodiment, the conveying means 34 preferably is an endless conveyor belt, and the conveyor subassembly 24 preferably includes lower and upper conveyor rollers 30, 32 positioned substantially at the lower and upper ends 26, 28 respectively, for engaging the conveyor belt 34.

As can be seen in FIG. 5, the lower and upper conveyor rollers 30, 32 preferably define one or more conveyor planes 40 therebetween. It will be appreciated that the lower and upper ends 26, 28 also define the conveyor plane 40. The conveyor plane 40 preferably is substantially parallel to an upper surface 67 of the conveying means 34, the upper surface 67 extending between the lower and upper ends 26, 28 of the conveyor subassembly 24.

It is also preferred that each engagement device axis 42, 44 is positioned at a preselected angle θ therefor relative to the conveyor plane 40, for lifting the object 10 at least partially over the lower end 26 of the conveyor subassembly 24 as the object 10 is moved onto the conveyor belt 34. In practice, to accomplish the lifting movement, the preselected angle θ preferably is at least slightly obtuse. Preferably, the preselected angle θ is between approximately 90.5° and approximately 105°. In one embodiment, each of the engagement devices 33 preferably is a roller.

Figure 11:
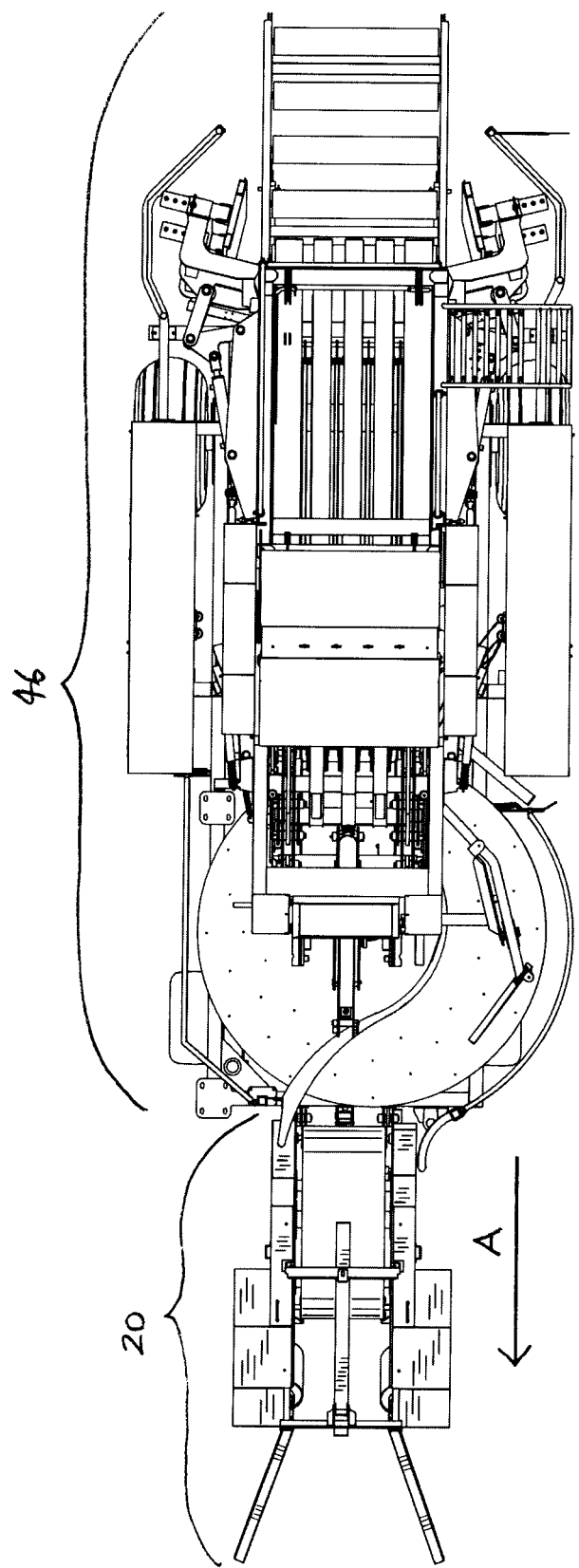
FIG. 11 is a top view of a machine with the pick-up assembly of FIG. 1B mounted thereon, drawn at a smaller scale.

It will be understood that the pick-up assembly 20 is mounted on a machine 46 (FIG. 11). Preferably, the machine 46 is any machine for holding and/or processing the objects 10 which are moved off the surface 22. The pick-up assembly 20 preferably is attached to the machine 46 with the upper end 28 proximal to the machine 46. When the bale is moved to the upper end 28, the bale then exits the pick-up assembly 20 to fall onto or otherwise is placed in or on the machine 46.

In particular, and as will be described, the pick-up assembly 20 is adapted to engage and move the bales 10 discretely (i.e., serially) while the machine 46, and the pick-up assembly 20 mounted thereon, are travelling relative to the surface 22 in the direction indicated by arrow "A" (FIGS. 3, 5A-6). For instance, the machine 46 (and the pick-up assembly 20 mounted thereon) may travel in the direction indicated by arrow A at between about 8 km/hr. (about 5 mph) and about 15 km/hr. (about 9 mph).

Figure 4:
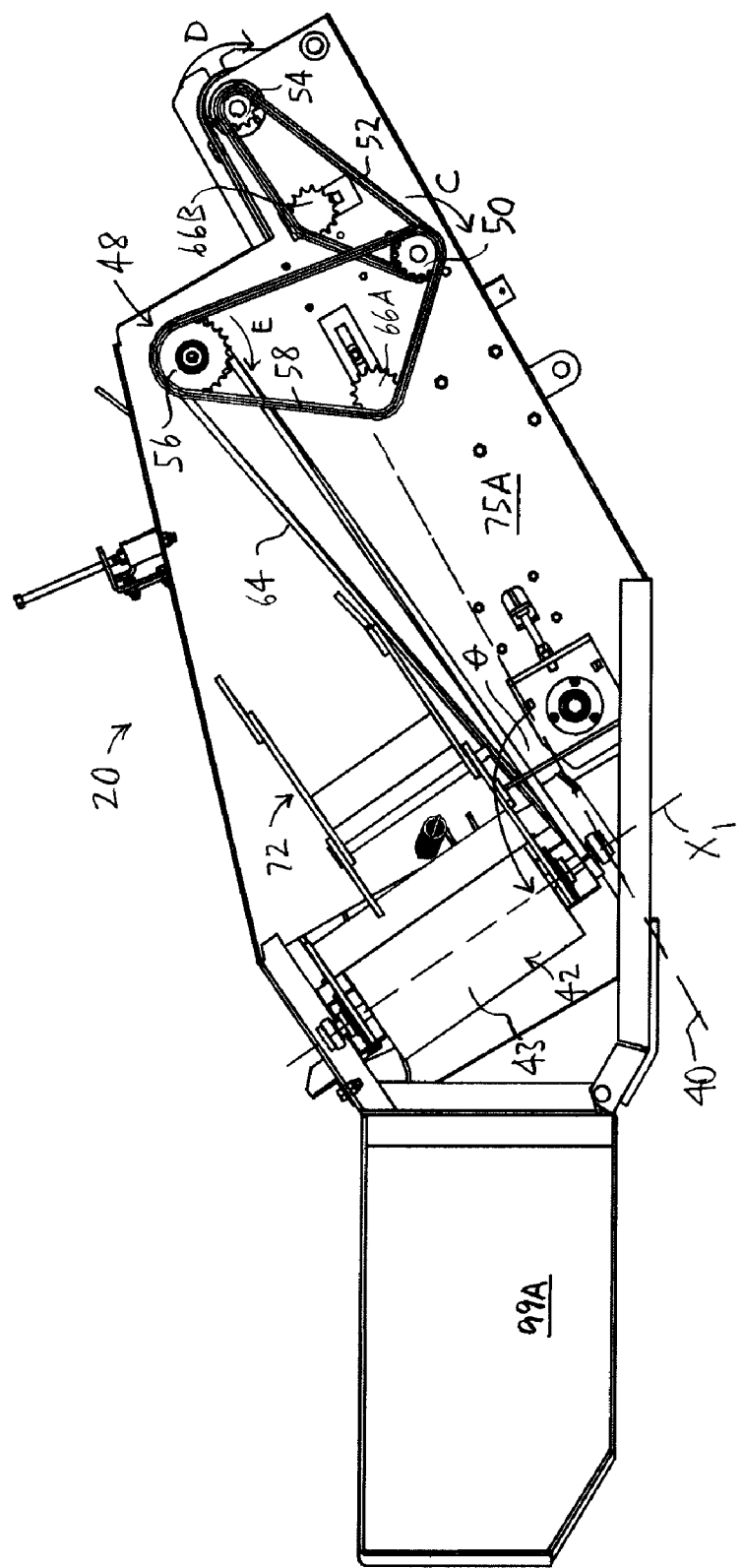
FIG. 4 is a first side view of the pick-up assembly of FIG. 1B, drawn at a larger scale.

Those skilled in the art will appreciate that any suitable source(s) of power may be used to rotate the engagement devices 42, 44 and/or to move the conveyor belt 34. However, in one embodiment, the pick-up assembly 20 preferably is powered by a single power source (not shown) which, via drive systems 48, 48' (FIGS. 4, 6), transfers power created thereby to the conveyor rollers (i.e., to move the conveyor belt 34), and to the rollers 42, 44. For example, in one embodiment, the power source preferably is a hydraulic motor (not shown) with a first sprocket 50 directly secured thereto, rotated by the hydraulic motor (FIG. 4).

Those skilled in the art will appreciate that any suitable drive system may be used. Preferably, each of the drive systems is a combination chain-and-belt drive system. As can be seen in FIG. 4, the first sprocket 50 preferably is connected by a first chain or other suitable power transmission means 52 to a first conveyor sprocket 54, so that the upper conveyor roller 32 is rotated when the first sprocket 50 is rotated. (The first conveyor sprocket 54 is coaxial with and secured to the upper conveyor roller 32.) Also, the first sprocket 50 preferably is connected to a second sprocket 56 via a second chain (or other suitable power transmission means) 58. Preferably, a first pulley 60 (FIG. 3) is coaxial with and secured to the second sprocket 56, so that the first pulley 60 rotates with the second sprocket 56.

Figure 1B:
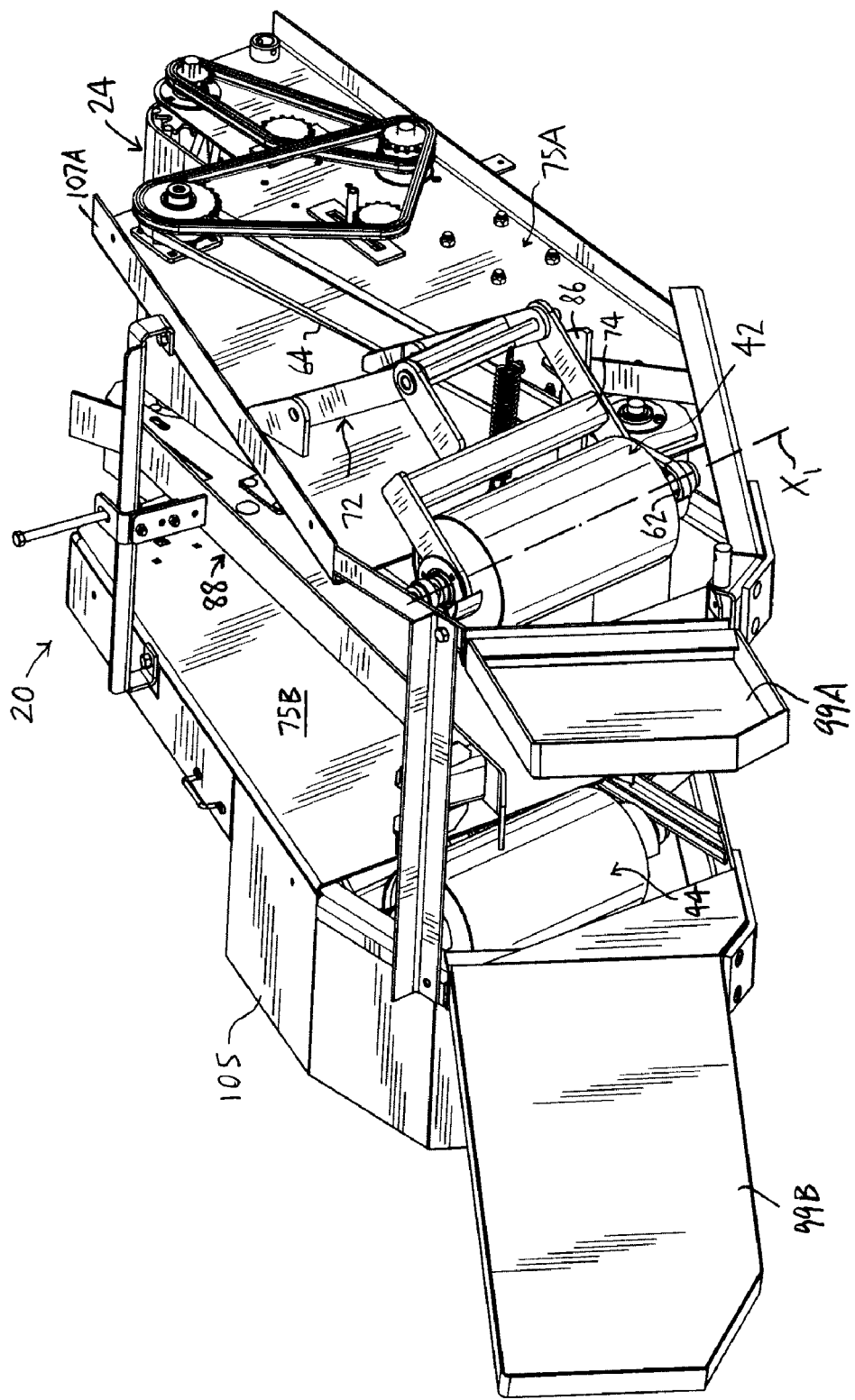
FIG. 1B is an isometric view of an embodiment of a pick-up assembly of the invention, drawn at a smaller scale.

A second pulley 62 preferably is mounted on a shaft 64 coaxial with the engagement device axis $X_1$ (FIG. 1B). As can be seen in FIGS. 1B and 4, the first pulley 60 and the second pulley 62 are connected by a V belt 64. However, those skilled in the art would appreciate that any suitable means for power transmission may be used to connect the pulleys. Due to the connection of the second pulley 62 and the first pulley 60 via the V belt 64, rotation of the second sprocket 56 results in rotation of the roller 42 about the axis $X_1$ therefor, as will be described.

The drive system 48 preferably also includes tensioning sprockets 66A, 66B for adjusting the tension of the first and second chains 52, 58 from time to time, as is known in the art.

Figure 3:
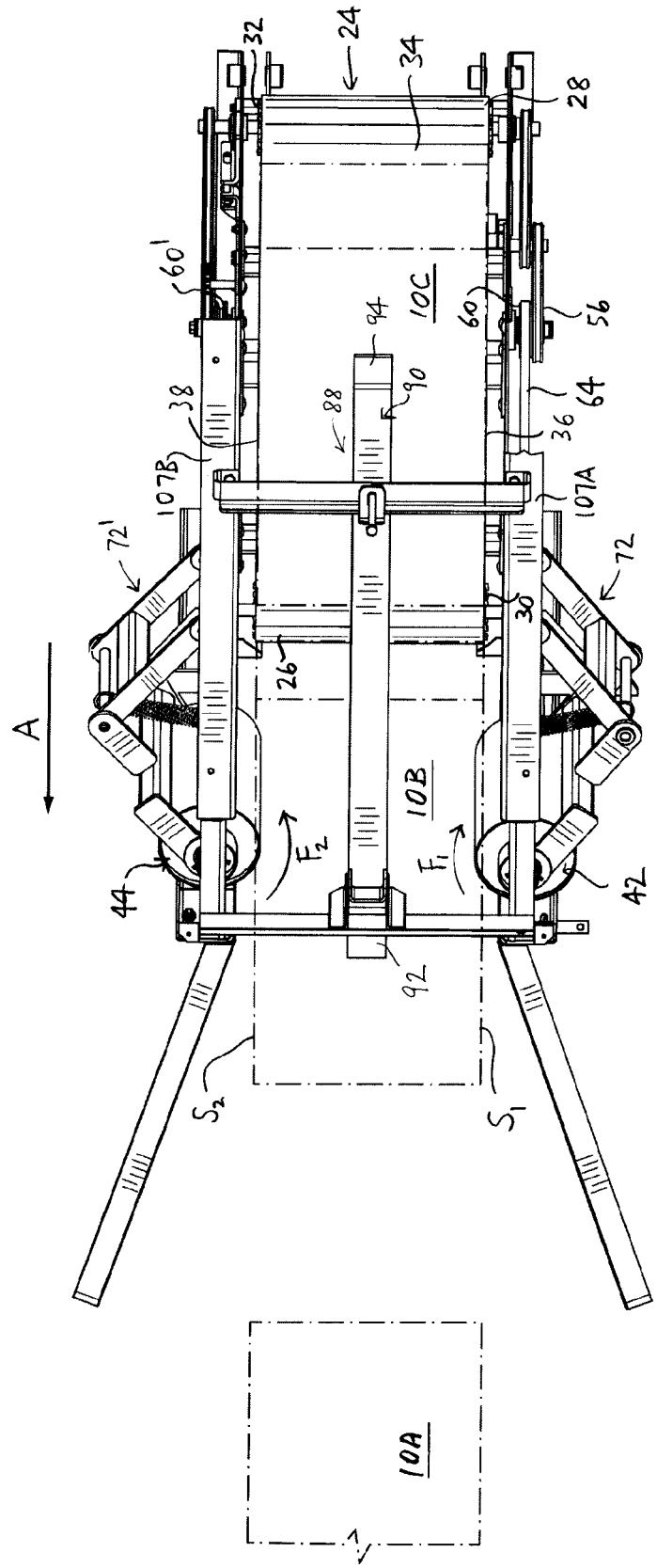
FIG. 3 is a top view of the pick-up assembly of FIG. 1B.
Figure 8A:
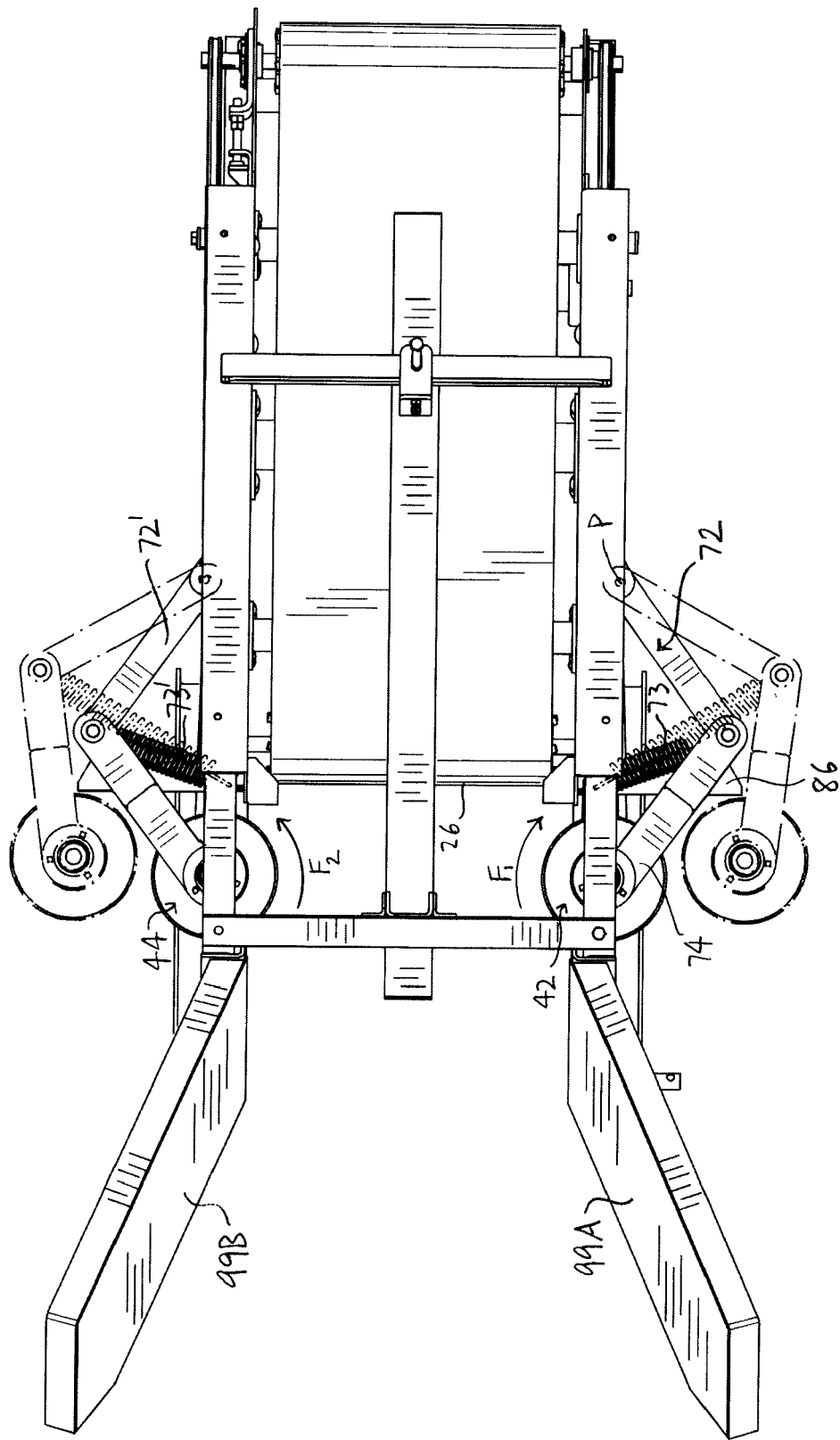
FIG. 8A is a top view orthogonal to top ends of the rollers in the pick-up assembly of FIG. 1B.
Figure 8C:
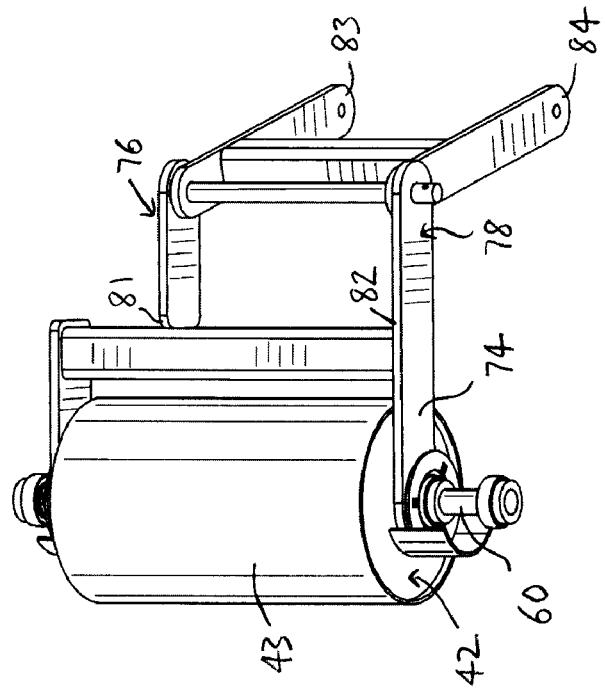
FIG. 8C is another isometric view of the bracket of FIG. 8B.
Figure 8B:
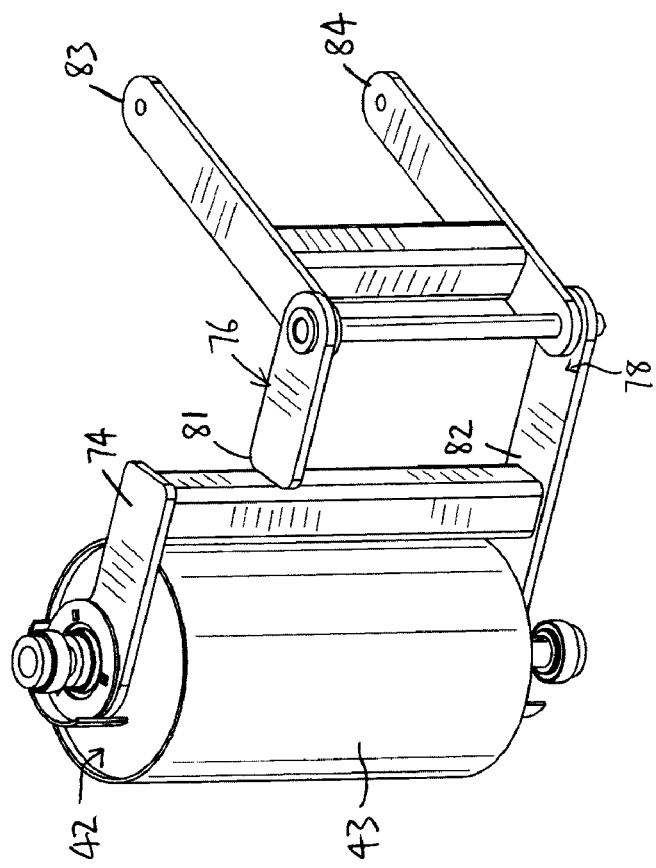
FIG. 8B is an isometric view of an embodiment of a bracket of the invention, drawn at a larger scale.
Figure 10:
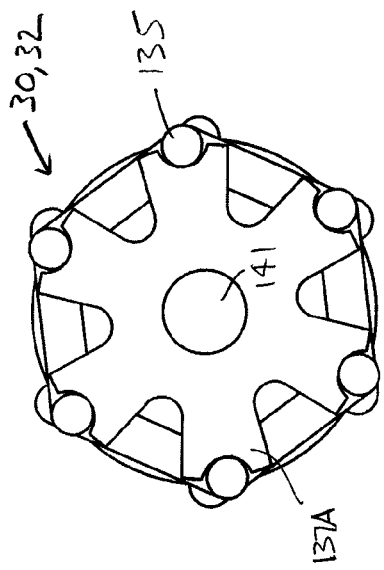
FIG. 10 is an end view of the conveyor roller of FIG. 9.
Figure 9:
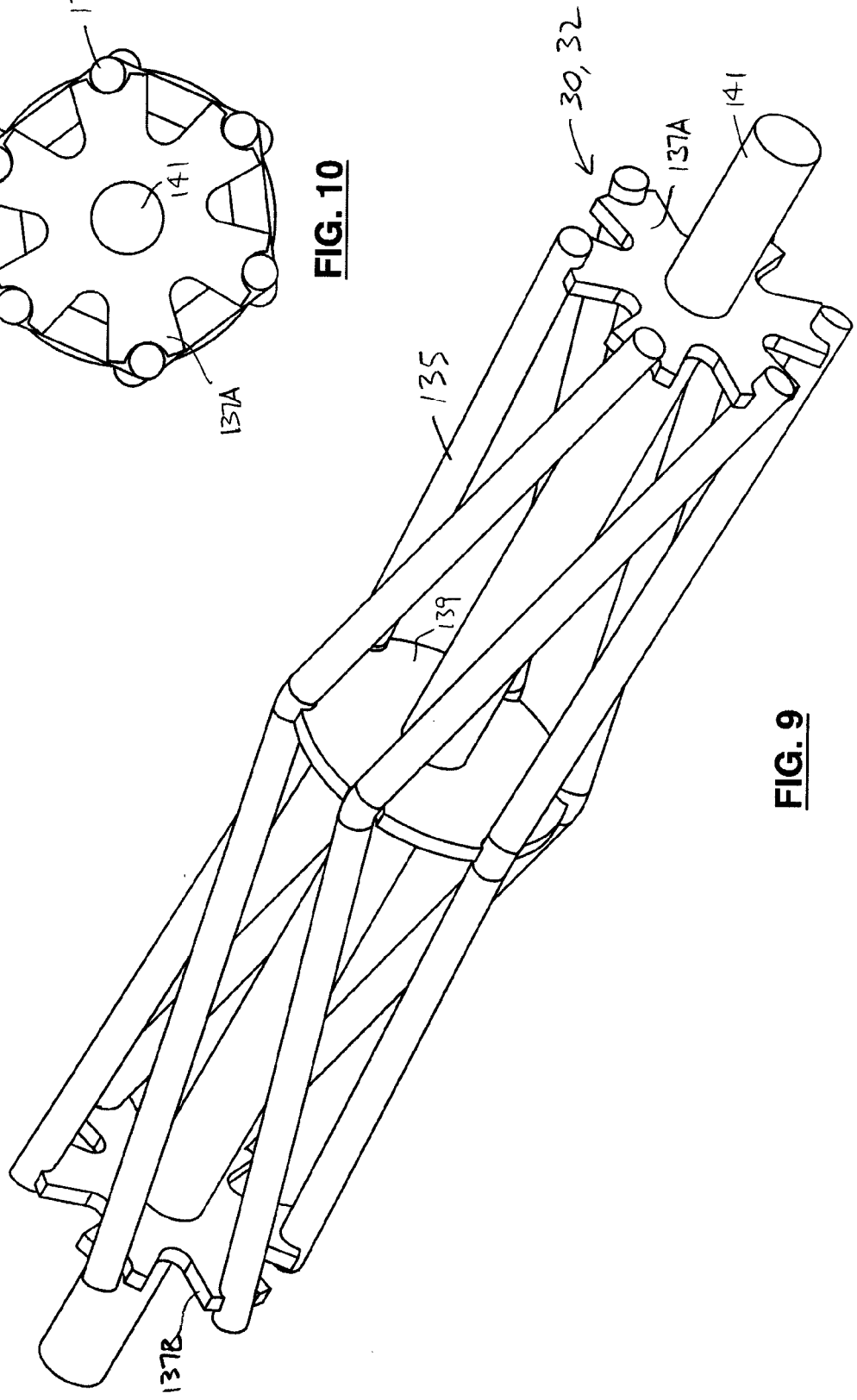
FIG. 9 is an isometric view of an embodiment of a conveyor roller of the invention, drawn at a larger scale.

It will be appreciated by those skilled in the art that, as illustrated in FIG. 4, when the first sprocket 50 is rotated in a clockwise direction (as indicated by arrow "C" in FIG. 4), the first conveyor sprocket 54 also rotates in a clockwise direction, as indicated by arrow "D" in FIG. 4. This results in clockwise rotation of the upper conveyor roller 32, and consequent movement of the conveyor belt 34 so that the object 10, when positioned on the upper surface 67 (FIGS. 5A, 5B) is moved from the lower end 26 to the upper end 28, i.e., in the direction indicated by arrow "G" in FIGS. 5A and 5B. Also, because the conveyor belt 34 is under tension and is stretched between the lower and upper conveyor rollers 30, 32, the movement of the conveyor belt 34 due to rotation of the upper conveyor roller 32 results in rotation of the lower conveyor roller 30 in the same direction. Similarly, and at the same time, the second sprocket 56 is also rotated in a clockwise direction (as illustrated in FIG. 4), as indicated by arrow "E" in FIG. 4. As noted above, via the V belt 64, this rotation ultimately causes the roller 42 to rotate about the engagement device axis $X_1$ in the direction indicated by arrow "$F_1$", as shown in FIGS. 3 and 8A. (The engagement device axes for the rollers 42 and 44 are identified as $X_1$ and $X_2$ respectively in FIGS. 1B, 3, 4, 5A, and 5B for clarity.)

Figure 6:
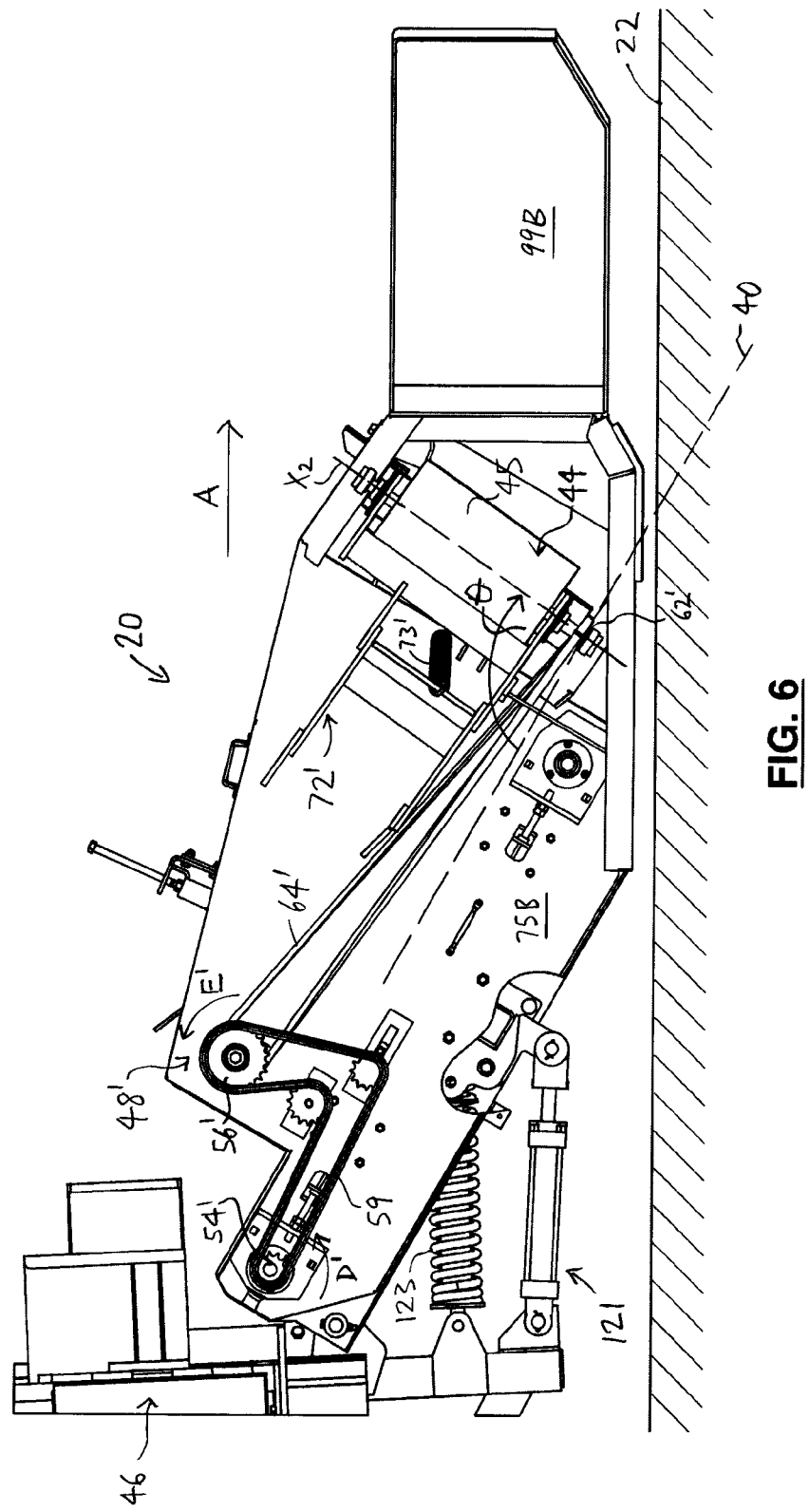
FIG. 6 is a second side view of the pick-up assembly of FIG. 1B, with a part of the body cut away to show a part of a floatation suspension.

It will be appreciated by those skilled in the art that, as can be seen in FIG. 6, the roller 44 preferably is driven by a second drive system 48'. Although those skilled in the art would appreciate that many different arrangements are possible, in one embodiment (hereinafter described), it is preferred that only one hydraulic motor drives the conveyor belt and both rollers 42, 44. The second drive system 48' includes a second conveyor sprocket 54' which is mounted to (and coaxial with) the upper conveyor roller 32. It will be understood that rotation of the upper conveyor roller 32 in the clockwise direction (as illustrated in FIG. 4) is illustrated in FIG. 6 as rotation of the upper conveyor roller 32 in a counterclockwise direction.

As can be seen in FIG. 6, when the upper conveyor roller 32 is rotated in a counterclockwise direction (as indicated by arrow "D'" in FIG. 6), the second conveyor sprocket 54' is also rotated counterclockwise. The second conveyor sprocket 54' and a second sprocket 56' are connected by a chain or other suitable power transmission means 59, and counterclockwise rotation of the second sprocket 56' as indicated by arrow "E'" in FIG. 6) therefore results from counterclockwise rotation of the second conveyor sprocket 54'. In turn, such rotation of the second sprocket 56' results in rotation of a first pulley 60' (FIG. 3) coaxial therewith. The first pulley 60' and the second pulley 62' are connected by a V belt 64', so that counterclockwise rotation of the first pulley causes rotation of the roller 44 about its axis, designated as $X_2$. (In FIG. 3, the V belt 64' is omitted so that the pulley 60' may be clearly shown.)

Figure 5A:
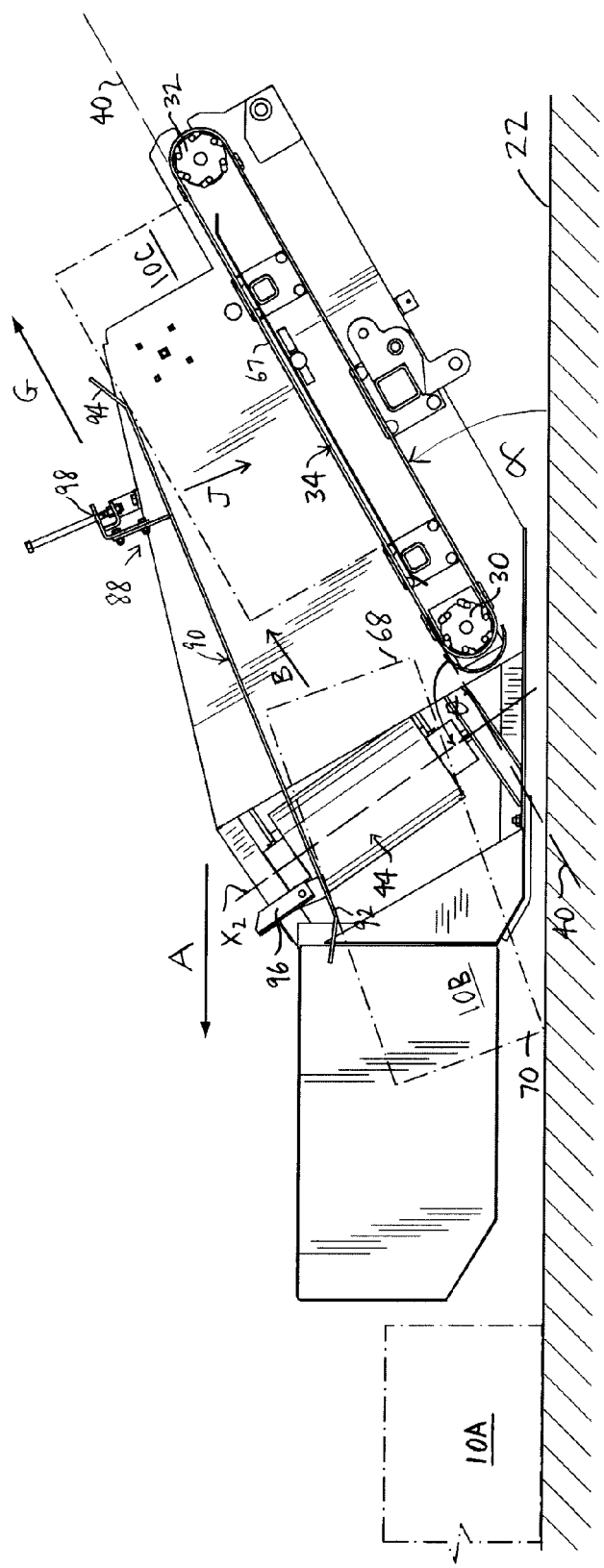
FIG. 5A is a cross-section of the pick-up assembly of FIG. 1B, showing bales at certain positions thereon.

By way of example, three bales identified for convenience as 10A-10C respectively are shown in FIG. 3. As illustrated in FIG. 3, the bale 10A has not yet been engaged by the rollers 42, 44, but is generally aligned with the conveyor belt 34. In FIGS. 3 and 5A, the bale 10B is shown as when first engaged by the rollers 42, 44, which are moving the bale 10B onto the conveyor belt 34. Also in FIGS. 3 and 5A, the bale 10C is shown shortly after it has been positioned on the conveyor belt 34. The bale 10C is moved upwardly by the conveyor belt 34 at an angle, i.e., in the direction indicated by arrow "G" in FIG. 5A.

The bale 10B is shown in FIG. 5A shortly after it has been engaged by the rollers 42, 44. As can be seen in FIG. 5A, due to the rollers' axes $X_1$, $X_2$ being at the preselected angle θ relative to the conveyor plane 40, after the bale 10B is first engaged by the rollers 42, 44, a leading end 68 of the bale 10B is lifted above a trailing end 70 thereof, i.e., the leading end 68 is raised, so that the bale 10B is tilted upwardly. As can be seen in FIG. 5A, the leading end 68 preferably is lifted over the lower end 26 of the conveyor subassembly 24, as the bale 10B is also moved generally upwardly (i.e., in the direction indicated by arrow "B" in FIG. 5A). Accordingly, each bale's leading end is lifted over the lower end 26 of the conveyor subassembly 24, thereby minimizing the risk that any bale may be pushed along the ground surface, and also minimizing the risk of damage to the bale. As will be described, as the bale is lifted over the lower end of the conveyor subassembly, it is also propelled onto the conveyor belt 34 by the rollers 42, 44.

Figure 5B:
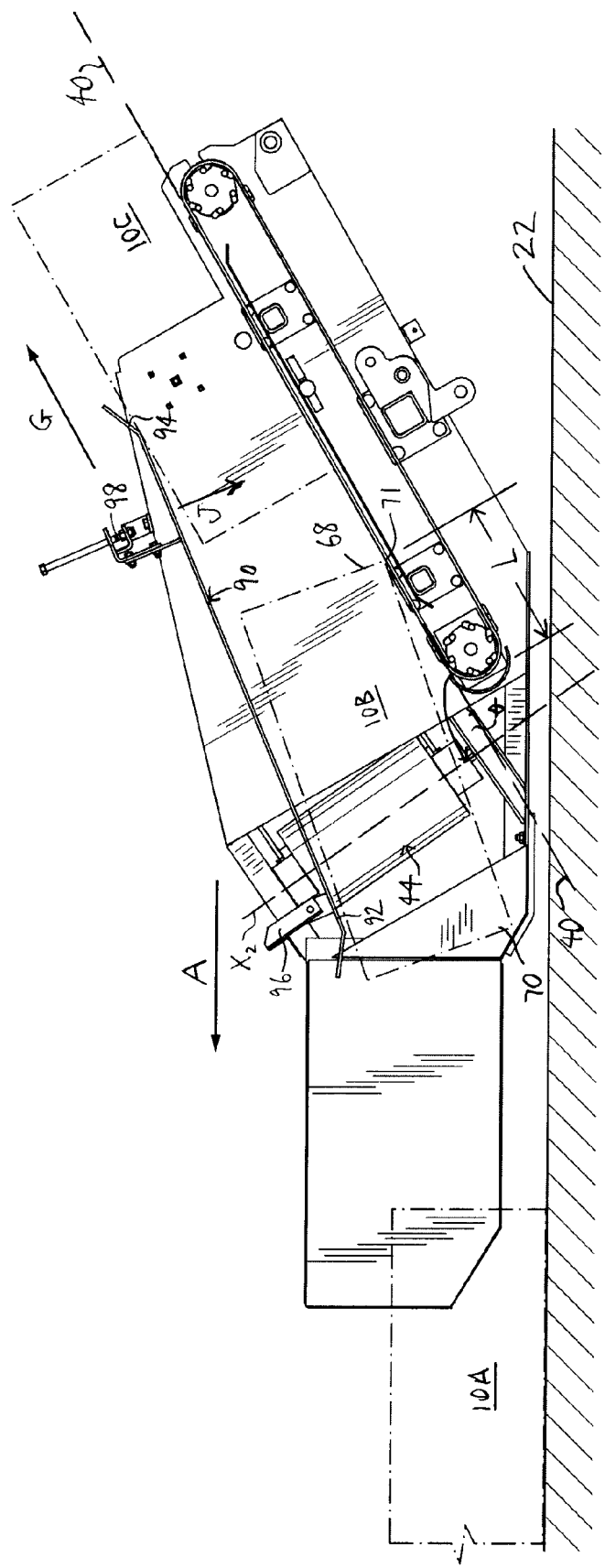
FIG. 5B is the cross-section of FIG. 5A, showing the bales of FIG. 5A at positions subsequent to those illustrated in FIG. 5A.

In FIG. 5B, the bales 10A-10C are shown positioned relative to the conveyor subassembly 24 a few seconds after the situation illustrated in FIG. 5A. As shown in FIG. 5B, at this point, the bale 10B is still engaged by the rollers 42, 44. The leading edge 68 of the bale 10B engages the conveyor belt 34 at a point 71 (FIG. 5B). It will be apparent that, when the bale 10B is in the position shown in FIG. 5B, the conveyor belt 34 engages the leading edge 68 of the bale 10B (i.e., pulling the bale 10B upwardly along the conveyor plane 40), and the rollers 42, 44 remain engaged with the bale 10B also, to push the bale 10B generally upwardly, in a direction generally up the conveyor plane 40.

The point 71 at which the leading edge 68 engages the conveyor belt 34 is a distance "L" sufficiently distant from the lower end 26 of the conveyor subassembly 22 that the bale 10B is unlikely to fall off the conveyor belt 34 and be pushed along on the surface 22 by the lower end 26 of the conveyor subassembly 24. For example, it has been found that the assembly works well if the distance L is at least approximately 10 inches.

From FIGS. 5A and 5B, it can be seen that, when the bale 10B has moved past the rollers 42, 44 and is thereby released, a sufficient proportion of the bottom surface of the bale 10B engages the conveyor belt 34 that the bale 10B does not fall down, off the conveyor belt 34, but is instead engaged by the conveyor belt 34 and carried thereby to the upper end 28, at which the bale 10B is discharged from the conveyor subassembly 24.

Preferably, the rollers 42, 44 are made of, and covered with, any suitable material(s). In one embodiment, the rollers 42, 44 are hollow steel cylinders approximately 8 inches in diameter and approximately 14 inches long. Also, the rollers 42, 44 preferably have a relatively soft rubber or plastic coating (e.g., the product known as "rough top pulley lagging") on engagement surfaces 43, 45 thereof respectively (FIGS. 4, 6) for gripping the bales, with minimal damage to the bales. However, those skilled in the art will appreciate that the rollers 42, 44 may have any suitable shape, whether regular or irregular, and may be made of any suitable material(s).

In one embodiment, and as can be seen in FIG. 8A, each roller 42, 44 is mounted in a bracket 72, 72' respectively movable between an inner position, in which each roller 42, 44 is located proximal to the lower end 26 of the conveyor subassembly 24, and an outer position, in which each roller 42, 44 is located distal to the lower end 26 of the conveyor subassembly 24 (FIG. 8A). Preferably, each bracket 72, 72' is biased to the inner position therefor. It is preferred that each bracket 72, 72' is biased to the inner position by one or more resilient biasing means 73, 73' respectively. It will be understood that the rollers 42, 44, the brackets 72, 72' and the resilient biasing means 73, 73' are shown in FIG. 8A in solid outline in the inner position and in chain-dotted outline in the outer position, for clarity of illustration.

For clarity, the brackets for the rollers 42, 44 are identified in FIGS. 3 and 8A as 72 and 72' respectively. In the following description, only the bracket 72 is described in detail, for convenience. It will be understood that the brackets 72, 72' are mirror images of each other, and do not differ materially.

As can be seen in FIGS. 1B and 8A, in one embodiment, the bracket 72 preferably includes a mounting portion 74 in which the roller 42 is rotatably mounted, and upper and lower arms 76, 78 (FIGS. 8B, 8C) extending between first and second ends 81, 82, and 83, 84 respectively thereof. Preferably, the first ends 81, 82 of the upper and lower arms 76, 78 respectively are secured to the mounting portion 74 by any suitable means, e.g., welding. It is also preferred that the second ends 83, 84 are pivotably mounted on a wall portion 75A of the pick-up assembly 20, so that the bracket 72 pivots about a pivot point "P".

As can be seen in FIGS. 1B-3, the pick-up assembly 20 preferably includes wall portions 75A, 75B positioned on opposite sides of the conveyor subassembly 24. Preferably, the resilient biasing means 73 includes one or more springs extending between the wall portion 75A and the bracket 72. Pins are mounted in tabs (not shown) to position pivot points "P" appropriately, as is known in the art. It is preferred that each resilient biasing means 73 is a spring. As can be seen in FIG. 1B, each spring 73 may be connected to the lower arm 78 of the bracket 72.

For clarity of illustration, only one spring 73 is shown. The springs 73 bias the bracket 72 to the inner position. The springs 72 also serve to subject the V belt 64 to tension.

Figure 2:
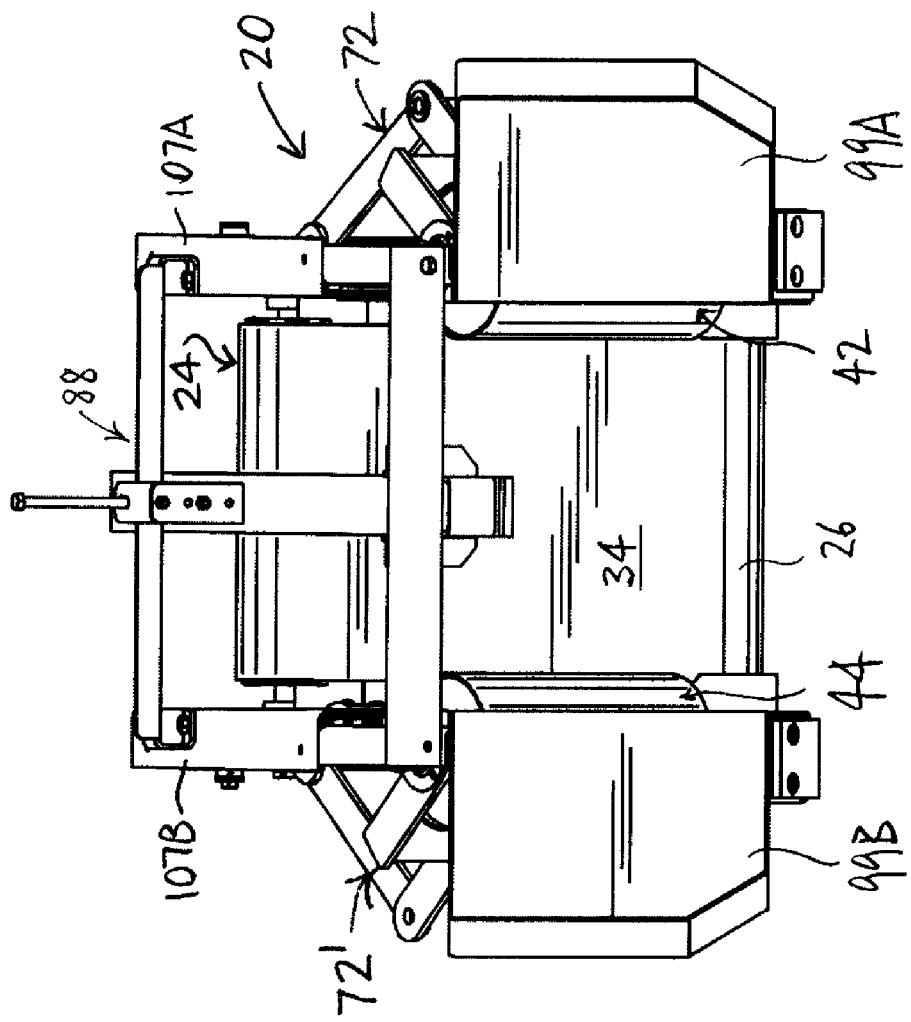
FIG. 2 is a front view of the pick-up assembly of FIG. 1B, drawn at a smaller scale.

As can be seen in FIGS. 2, 3, and 8A, when the brackets 72, 72' are in the inner position, the rollers 42, 44 are in position to engage each bale 10 as the pick-up assembly 20 is moved toward the bale 10. Preferably, the rollers 42, 44 are about 17 inches apart, when in the inner position. (This positioning has been found to work well when the bales are about 18 inches wide.) However, it will be understood that the locations of the brackets 72, 72' in FIG. 8A in the outer position are exaggerated, for the purposes of clarity in the illustration. Preferably, each of the brackets 72, 72' is movable between the inner and outer positions in order that the pick-up assembly 20 may pick up each bale 10 consistently, regardless of whether the bales 10 are not properly oriented relative to the conveyor belt 34, or whether, e.g., some bales are relatively small or otherwise deviate from the standard dimensions for a bale.

As can be seen in FIG. 3, when the brackets 72, 72' are in the inner position, the engagement devices 42, 44 preferably compress the bale slightly, squeezing the sidewalls $S_1$, $S_2$. (It will be understood that the sidewalls $S_1$, $S_2$ are not shown as being compressed in FIG. 3 for clarity of illustration.)

Preferably, each bracket 72, 72' is substantially rigid. Those skilled in the art will appreciate that the bracket 72, 72' may be made of any suitable materials. Preferably, the bracket 72, 72' is made of a suitable steel.

In one embodiment, each bracket 72 is at least partially supported by a stop element 86 therefor. As can be seen in FIGS. 1B and 8A, the stop element 86 preferably is a substantially flat member, cantilevered from the wall portion 75A, to support the bracket 72 (and the roller 42) in position. Because of the stop element 86, the bracket 72 is maintained in position relative to the conveyor subassembly 26, i.e., so that the axis $X_1$ substantially defines the predetermined angle θ relative to the conveyor plane 40.

Preferably, each bracket 72 slidably engages the stop element 86 therefor as each bracket 72 moves between the inner and outer positions (FIG. 8A). The lower arm 78 slidingly engages the stop element 86. It is preferred that a suitable lubricant (not shown) is positioned on the stop element 86, to facilitate the sliding engagement of the lower arm 78 with the stop element 86.

It will be understood that the outer position, as illustrated in FIG. 8A, is further out from the conveyor than is practical. The outer position has been exaggerated in this regard in FIG. 8A, for clarity of illustration. The bracket 72 preferably is supported by the stop element 86 as the bracket 72 moves between the inner and outer positions.

In one embodiment, the pick-up assembly additionally includes a control bar subassembly 88 (FIGS. 1B-3), for pressing the bale 10 onto the conveyor belt 34. Preferably, the control bar subassembly 88 includes a control bar 90 extending between a front end 92 and a back end 94 thereof, and a control bar bracket 96 in which the front end 92 of the control bar 90 is pivotably mounted (FIGS. 3, 5A, 5B). It is also preferred that the control bar subassembly 88 includes a spring means 98 engageable with the control bar 90, for urging the control bar 90 toward the conveyor belt 34, to press each bale 10 onto the conveyor belt 34 as each bale passes underneath the control bar 90.

As can be seen in FIGS. 5A and 5B, the control bar 90 is urged generally downwardly (i.e., in the direction indicated by arrow "J" in FIGS. 5A and 5B) by the spring means 98. As noted above, the front end 92 of the control bar 90 is pivotably mounted to the control bar bracket 96. The control bar 90, because the back end 94 thereof is urged downwardly by the spring means 98, presses each bale 10 passing under the control bar 90 onto the conveyor belt 34, which causes positive engagement of each bale 10 with the conveyor belt 34, to substantially prevent slippage of the bale 10 relative to the conveyor belt 34, once the bale 10 is located on the conveyor belt 34.

As can be seen, for instance, in FIGS. 3 and 8A, the assembly 20 preferably includes panels 99A, 99B mounted on the wall portions 75A, 75B respectively. The panels 99A, 99B are intended to "funnel" (or guide) bales 10 to the conveyor belt 34 as the pick-up assembly 20 is moved forward. As can be seen, for example, in FIG. 3, the panels 99A, 99B preferably are mounted on the wall portions 75A, 75B so as to define any suitable angle therebetween. For example, it has been found that the angle between the panels 99A, 99B and the wall portions 75A, 75B respectively may be approximately 160°.

As can be seen in FIG. 1B, the pick-up assembly 20 preferably includes a cover 105 for each side of the assembly 20, for covering the drive systems 48, 48', the chains and V belts mounted therein, the brackets 72, 72' and, to an extent, the rollers 42, 44. Although the cover 105 is shown mounted on only one side of the pick-up assembly 20, it will be understood that the cover 105 is mounted on both sides of the assembly 20. The cover 105 is omitted from the drawings generally, for clarity of illustration.

As can be seen in FIGS. 2 and 3, each of the wall portions 75A, 75B preferably includes a top flange 107A, 107B respectively, to provide a transverse surface to which various elements may be mounted. It will be understood that a part of the top flange 107A is omitted from FIG. 3 for clarity of illustration, i.e., in order that the pulley 60 and part of the V belt 64 may be clearly shown. Those skilled in the art will appreciate that the pick-up assembly 20 additionally includes a number of structural elements which are generally not shown, e.g., structural elements connecting the wall portions 75A, 75B. Because such elements and the details of construction regarding same are well known in the art, it is not necessary to describe them in detail.

Figure 7:
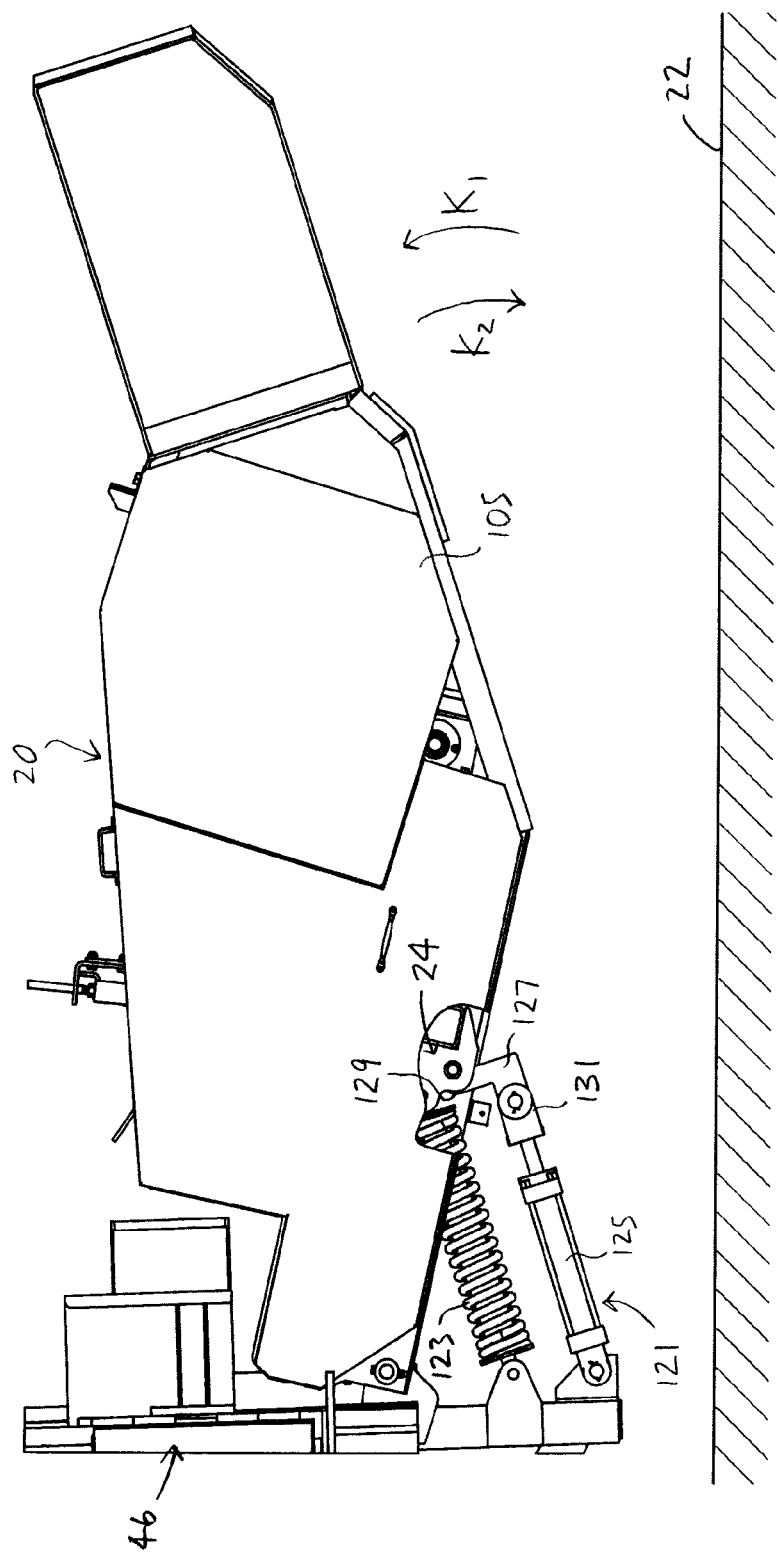
FIG. 7 is another view of the pick-up assembly of FIG. 6, showing the flotation suspension in a different position.

In use, the pick-up assembly 20 preferably is mounted on the machine or vehicle 46 (FIGS. 6, 7, 11). As can be seen in FIGS. 6 and 7, the pick-up assembly 20 preferably is mounted to the machine 46 via conventional means. The hydraulic motor (not shown) powering the conveyor subassembly 24 and the rollers 42, 44 preferably is itself activated by appropriate means therefor (not shown) mounted on the machine 46. For instance, in one embodiment, the hydraulic motor in the assembly 20 is connected in series with a second hydraulic motor in the machine 46, as is known in the art. Once the hydraulic motor in the assembly 20 has been operably connected to the means for activation therefor, the machine 46 (with the assembly mounted thereon) is ready to travel in the direction indicated by arrow A (FIG. 11). While the machine 46 and the pick-up assembly 20 are travelling forwardly (i.e., in the direction indicated by arrow A), the motor preferably is energized, causing the conveyor roller 32 to rotate (thereby moving the conveyor belt 34), and also causing the rollers 42, 44 to rotate about the axes $X_1$, $X_2$ respectively, as described above, so that the bales are picked up while the machine 46 is moving.

As shown in FIGS. 3, 5A, and 5B, as the bales 10 are encountered while the machine 46 and the assembly 20 move forward, the panels 99A, 99B guide the bales 10 toward the rollers 42, 44 and the conveyor belt 34. When the rollers 42, 44 are brought into contact with each bale (i.e., as the rollers are rotating), the rollers 42, 44 rapidly engage the sides of the bale 10 and, at least initially, lift it substantially in a direction orthogonal to the axes $X_1$, $X_2$ of rotation. The leading end 68 of the bale 10 is lifted over the lower end 26 of the conveyor subassembly 24, and the leading end 68 is engaged by the conveyor belt 34 at a distance "L" up the conveyor belt 34 from the lower conveyor roller 30. At that point, the bale 10 is pulled up the conveyor plane 40 by the conveyor belt 34, and is simultaneously pushed generally upwardly by the rollers 42, 44. When the trailing end 70 of the bale 10 passes between the rollers 42, 44, most of the bale 10 is positioned sufficiently far up the conveyor plane 40 that there is little risk of the bale 10 falling off the conveyor belt 34 at the lower end 26. As the bale 10 is moved onto the conveyor belt 34, the control bar subassembly 88 gently presses the bale 10 (to the extent it is positioned between the control bar 90 and the conveyor belt 34) onto the conveyor belt 34, to engage the bale 10 with the conveyor belt 34.

In another embodiment, as can be seen in FIGS. 6 and 7, the pick-up assembly 20 of the invention preferably includes a floatation suspension 121, for maintaining the conveyor subassembly 24 in a substantially consistent preselected position relative to the surface 22. (In FIGS. 6 and 7, part of the wall portion 75B is omitted to show parts of the floatation suspension, i.e., for clarity of illustration.) As can be seen in FIGS. 6 and 7, the floatation suspension 121 is movable between a base condition (FIG. 6) and an extended condition (FIG. 7). In FIG. 7, the floatation suspension 121 is shown after the machine 46 on which the pick-up assembly 20 is mounted has encountered a significant bump in the surface 22. The preselected position of the conveyor subassembly is shown in FIG. 6, i.e., when the floatation suspension 121 is in the base condition, the conveyor subassembly 24 is in the preselected position. As can be seen FIG. 6, when the conveyor subassembly 24 is in this position, the pick-up assembly 20 is positioned to pick up bales.

As can be seen in FIGS. 6 and 7, the floatation suspension 121 preferably includes a spring support means 123 pivotably connected to the conveyor subassembly 24, for urging the conveyor subassembly 24 to the preselected position relative to the surface 22.

In one embodiment, the flotation suspension 121 preferably also includes a hydraulic cylinder 125, pivotably connected to the conveyor subassembly 24, for urging the conveyor subassembly 24 to the preselected position, and a linkage bracket 127 pivotably connected to the conveyor subassembly 24 and extending between first and second ends 129, 131 thereof, the linkage bracket 127 being pivotably connected to the conveyor subassembly 24 at the first end 129 thereof.

The hydraulic cylinder 125 preferably is pivotably connected to the linkage bracket 127 at the second end 131. The spring support means 123 and the hydraulic cylinder 125 urge the conveyor subassembly 24 to the preselected position relative to the surface 22. As can be seen in FIG. 5A, the conveyor subassembly 24 preferably is positioned at an angle α relative to the surface 22. The angle α may be any suitable angle. Preferably, the angle α is about 30°.

Preferably, each of the spring support means 123 and the hydraulic cylinder 125 are pivotably mounted to the machine 46, thereby providing resilient linkages between the pick-up assembly 20 and the machine 46, so that the conveyor subassembly 24 is generally returned to the preselected positions after it has been subjected to bouncing and bumping.

It will be understood that the position of the conveyor subassembly 24 relative to the machine 46 as illustrated in FIG. 7 is exaggerated, for clarity of illustration. In FIG. 7, the pick-up assembly 20 is shown after the conveyor subassembly 24 has been pivoted upwardly (i.e., in the direction indicated by arrow "$K_1$"), e.g., after the machine 46 (and/or the pick-up assembly 20) has encountered a bump in the surface 22 while travelling forward. It will be appreciated by those skilled in the art that the floatation suspension 121 both dampens the downward movement and also allows the conveyor subassembly 24 to return to the base condition, i.e., in the direction indicated by arrow "$K_2$" in FIG. 7.

It will be appreciated by those skilled in the art that the pick-up assembly 20 preferably should extend from the front of the machine 46 on which it is mounted to a minimal extent, i.e., the overall length of the machine 46 and the pick-up assembly 20 combined preferably is minimized, to the extent feasible. In turn, this means that the conveyor plane 40 preferably should be positioned at the steepest angle which is feasible. In practice, it has been determined that the steepest feasible angle is about 30°.

Preferably, each of the conveyor rollers 30, 32 includes a framework of ribs 135 spaced apart to permit material (not shown) to flow therethrough. Preferably, the ribs 135 are formed to direct the material out of the conveyor roller 30, 32 as the conveyor roller 30, 32 rotates. For example, in practice, small pieces of hay may fall into the part of the conveyor where the conveyor rollers 30, 32 are located. Such material tends to be swept away by the ribs 135 which are arranged to do so.

In one embodiment, each conveyor roller includes end portions 137A, 137B and a central support element 139 mounted on an axle 141. The ribs 135 preferably extend between the end portions 137A, 137B, and are supported by the central support element 139. It will be understood that the conveyor sprockets 54, 54' are coaxially mounted on the opposite ends of the axle 141.

It will be appreciated by those skilled in the art that the invention can take many forms, and that such forms are within the scope of the invention as claimed. Therefore, the spirit and scope of the appended claims should not be limited to the descriptions of the preferred versions contained herein.

I claim:

1. A pick-up assembly for moving an object off a surface, the pick-up assembly comprising:
   a conveyor subassembly extending between lower and upper ends thereof;
   the conveyor subassembly comprising a conveying means extending between the lower and upper ends, for moving the object to the upper end;
   at least two engagement devices positioned proximal to the lower end of the conveyor subassembly for engaging opposing sides of the object respectively, to move the object onto the conveying means;

the conveying means being an endless conveyor belt and the conveyor subassembly comprises lower and upper conveyor rollers positioned substantially at the lower and upper ends respectively, for engaging the conveyor belt;

the lower and upper conveyor rollers defining at least one conveyor plane therebetween;

each of said at least two engagement devices being rotatable about an engagement device axis therefor;

each said engagement device axis being positioned at a preselected angle therefor relative to said at least one conveyor plane, for lifting the object at least partially over the lower end of the conveyor subassembly as the object is moved onto the conveyor belt;

each of said at least two engagement devices being a roller;

each said roller being mounted in a bracket movable between an inner position, in which said roller is located proximal to the lower end of the conveyor subassembly, and an outer position, in which said roller is located distal to the lower end of the conveyor subassembly; and each said bracket slidably engaging the stop element therefor as each said bracket moves between the inner and outer positions.

2. A pick-up assembly according to claim 1 additionally comprising a control bar subassembly, for pressing the object downwardly onto the conveyor belt.

3. A pick-up assembly for moving an object off a surface, the pick-up assembly comprising:

a conveyor subassembly extending between lower and upper ends thereof;

the conveyor subassembly comprising a conveying means extending between the lower and upper ends, for moving the object to the upper end;

at least two engagement devices positioned proximal to the lower end of the conveyor subassembly for engaging opposing sides of the object respectively, to move the object onto the conveying means;

a control bar subassembly, for pressing the object onto the conveyor belt;

the control bar subassembly comprising:

a control bar extending between a front end and a back end thereof;

a control bar bracket in which the front end of the control bar is pivotably mounted; and a spring means engageable with the control bar, for urging the control bar downwardly toward the conveyor belt, for pressing each said object downwardly onto the conveyor belt.

4. A pick-up assembly for moving an object off a surface, the pick-up assembly comprising:

a conveyor subassembly extending between lower and upper ends thereof;

the conveyor subassembly comprising a conveying means extending between the lower and upper ends, for moving the object to the upper end;

at least two engagement devices positioned proximal to the lower end of the conveyor subassembly for engaging opposing sides of the object respectively, to move the object onto the conveying means;

a floatation suspension, for maintaining the conveyor subassembly in a substantially consistent position relative to the surface;

the floatation suspension comprising:

a spring support means pivotably connected to the conveyor subassembly, for urging the conveyor subassembly to a predetermined position relative to the surface;

a hydraulic cylinder, pivotably connected to the conveyor subassembly, for urging the conveyor subassembly to the predetermined position;

a linkage bracket pivotably connected to the conveyor subassembly and extending between first and second ends thereof, the linkage bracket being pivotably connected to the conveyor subassembly at the first end thereof;

the hydraulic cylinder means being pivotably connected to the linkage bracket at the second end; and the spring support means and the hydraulic cylinder means urging the conveyor subassembly to the predetermined position relative to the surface.

5. A pick-up assembly according to claim 4 additionally comprising a control bar subassembly, for pressing the object downwardly onto the conveyor belt.

* * * * *